Nov. 6, 1962  A. H. J. DE LASSUS ST-GENIES  3,062,121
METHOD FOR OBTAINING A SECONDARY COPY OF A RELIEF
IMAGE ON LENTICULAR SUPPORT
Filed July 28, 1954
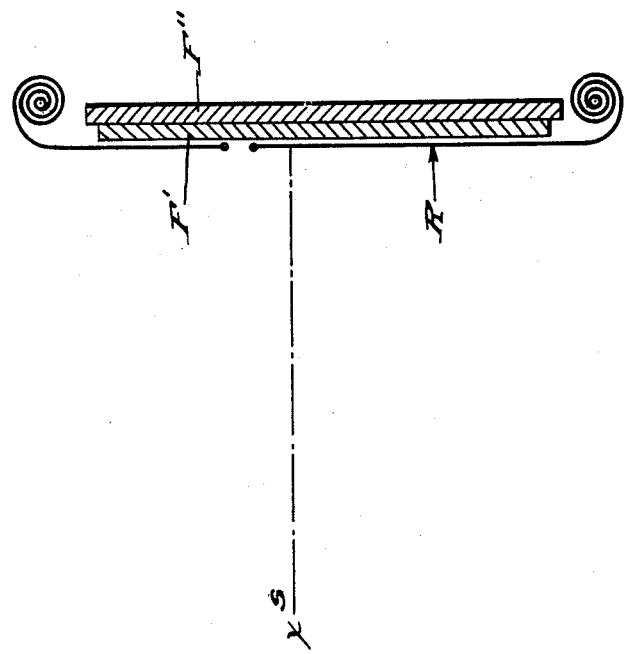
INVENTOR
Anne Henri Jacques DeLassus
St. Genies.
BY Stone & Mack
ATTORNEYS

3,062,121
METHOD FOR OBTAINING A SECONDARY COPY OF A RELIEF IMAGE ON LENTICULAR SUPPORT
Anne Henri Jacques de Lassus St-Geniès, 18 Blvd. Emile Augier, Paris XVIe, France
Filed July 28, 1954, Ser. No. 446,293
Claims priority, application France July 29, 1953
2 Claims. (Cl. 95—75)

In my co-pending U.S. patent application Serial No. 418,205 now Patent 2,800,064, July 23, 1957, there is described a method for contact printing a lenticular original on a non-lenticular photographic material by means of which, by simultaneous scanning all the elementary chambers of the original with the aid of a mobile light source and in the "central pupil" of the original by means of the concomitant relative sliding of the two surfaces in contact equal to at most twice the pitch of said chambers, the reversal of the elementary images is ensured whilst copying.

The object aimed at is the direct perception through a superposed selector of the correct relief on the copy, when the original shows the reversed relief for the observer placed in the "central pupil" of this original. Indeed, the recording, in a more or less great number of elementary chambers of the original, of each of the points of the image space constructed by the objective, is represented on the emulsion by a sum of spots equal to that number the pitch of which is larger or smaller than that of the elementary chambers according to whether the image point considered is constructed in front of or behind the lenticulation. The reversal of the elementary images over their width inverts the relation of the pitch of these spots to that of the elementary chambers, and, consequently, ensures the reversal of the relief.

The present invention more particularly aims at a definition of the conditions for obtaining in a given size of the original photographs, starting from such first copies on non-lenticular supports, other copies of the same size on non-lenticular supports, as well as the characteristics of their separable selectors for ensuring the aerial construction of the "central pupil" of these secondary copies at such predetermined distance and under such predetermined width which procure the best viewing conditions of the relief, necessarily still identical to this considered size, whatever might have been the focal lengths of the objectives having recorded the original photographs.

As to the printing method of the first copies, it was said in my co-pending application cited that the amplitude of the relative sliding between the gelatined sides whilst copying had to be slightly less, or at most equal to twice the pitch $p$ of the lenticulation of the original and that this sliding was to occur transversely to the direction of the generatrices of the cylindrical lenticulation in such a sense that the emulsion of the copy be imprinted without discontinuity and without overlappings between recorded elementary images.

From this first copy may be obtained (by proceeding with the aid of an enlarging cone in optical way, to a slight enlargement or reduction in the transversal direction of the lining of the elementary images) secondary copies of which the pitch of the elementary images is exactly of the same size, which procures with a detachable selector of given characteristics a size for the pupil of this secondary copy and a distance of this pupil which are as much different from those of the original or of its first copy as desired and which with a given size of the photographs answer to the viewing requirements of the pleasing reliefs for the observers situated in proximity of this pupil.

This result may be obtained by application of contact printing method and with the aid of the relative sliding of the gelatined layers, the description of which follows in reference with the figure of the drawing.

The figure of the annexed drawing represents, in contact with their gelatined sides and in section by a plane perpendicular to the direction of the elementary images of the first copy, this first copy on non-lenticular support of which the pitch of the elementary images is strictly equal to that of the original and an unexposed non-lenticulated emulsion-coated support for obtaining a secondary copy, disposed together behind a curtain bearing a mobile slit in contact with the first copy.

The first copy is represented by the film $F'$. In contact with this film by their gelatined layers, an unexposed film $F''$ will furnish the secondary copy to the desired new pitch of the elementary images in the following conditions.

A curtain R, representing a narrow slit of a direction parallel to the lines of the elementary images borne by $F'$, may move in movement parallel to the plane of the figure. The light-source S intended to imprint the film $F''$ through the film $F'$ is fixed behind end rather far from the curtain R. If a relative sliding movement of weak amplitude between the two gelatined layers occurs in the direction perpendicular to the lines of the elementary images of $F'$ whilst the slit of the curtain R goes over the width of the film $F'$ in the plane of the figure, the total image recorded on the film $F''$ may cover a width scarcely larger or smaller than the width of the film $F'$ according to the direction of the relative sliding between layers and its size, the difference between these two widths remaining very small in each case. During the exposure time of each elementary image, the displacement of the slit of the curtain is then slight and consequently, if this slit is rather narrow, the spreading of this image whilst copying is itself imperceptible. Indeed, the amount of the relative sliding between $F'$ and $F''$ in the same short time is unappreciable and practically null. By conveniently adjusting the width of the slit of the curtain R, the relative sliding between films permits to obtain such value as desired for the relation between the pitches of the elementary images of $F'$ and $F''$ without alteration of the elementary images recorded and without noticeable difference between the width of the images $F'$ and $F''$ in the direction of sliding, their magnitude being strictly the same in the direction of the elementary image lining.

It is then evident that a viewing selector of given characteristics, equipped with a film $F''$ obtained as is said, procurs a convergence distance of the axes of the beams of the elementary chambers, different from that which may be proper to the film $F'$ by reason of the difference existing between the pitches of the elementary images of these two films.

If the elementary images borne by the film $F''$ are joined, the size of the pupil of the whole constituted for viewing by the film $F''$ and its selector only depend upon the new value of this convergence distance.

One sole selector may thus be adopted for a satisfactory viewing in relief of secondary copies whatever might have been the focal distances of the objectives having recorded in given size the different originals, if at the different values of the convergence distance characterizing the original films F and after obtaining from these films the first copies $F'$ on non-lenticular supports for ensuring the reversal of the elementary images over their width, secondary copies are made according to the art explained hereinabove, of which the pitch of the elementary images will have been stated according to the sole focal distance of the objective having recorded each of the original films considered, or in other words according to the pupillary distances on the original films, said distances resulting from the type of objective with which recording was made;

a certain pupillary distance corresponding to a type of objective not considering the generally unimportant variations resulting from the objective extension when recording.

Mutatis mutandis, if second copying is done by simple enlargement in optical way as suggested above, and this without relative sliding between the positions occupied in the enlarger by the first copy and the film recording the second copy, it is still with a given viewing selector, the enlarging factor about equal to the unity of a film F' in a film F", depending only from the focal length of the objective having recorded the corresponding original film F, in order that this film F" be observable in the best conditions, i.e. with a pupil of predetermined magnitude and position.

I claim:

1. Method for obtaining a secondary copy of stereoscopic images by contact printing which consists in recording said stereoscopic images on lenticular film in their original reverse form, then making from said lenticular film a primary contact copy of the said reversed images in correct relief upon a non-lenticular support by placing in close contact with the gelatinized side of said stereoscopic images the emulsion side of an unexposed film, then passing a narrow light source simultaneously and with uniform speed, transversely with respect to the lenticulations, across all the stereoscopic images over their whole width thereby copying them, whilst in a uniform movement and in the same period of time a relative sliding is effected between both said film surfaces in contact of an amplitude not greater than twice the lenticular pitch, and making it in such a direction that the emulsion of the copy is imprinted all over its extent without leaving discontinuities between the copied stereoscopic images, then placing the emulsion side of said primary contact copy in contact with the light-sensitive side of a secondary non-lenticular support and subjecting said emulsion side and said light-sensitive side to a very small relative and continuous sliding action in the proper direction to produce the desired change in size, while an opaque curtain with a narrow linear slit parallel to the elementary images of the primary copy is moved transversely to these elementary lineated images in front of the said primary copy across the whole width of said copy, a light source being fixed at a sufficient distance from this said curtain, the degree of relative sliding of the said supports being chosen in dependence on the focal length of the taking objective of the original, to permit better visual results when observing the stereoscopic secondary copies of pictures taken at different focal lengths.

2. Method for obtaining a secondary copy of stereoscopic images by contact printing which consits in recording said stereoscopic images on lenticular film in their original reverse form, then making from said lenticular film a primary contact copy upon a non-lenticular support by placing in close contact with the gelatinized side of said stereoscopic images the emulsion side of an unexposed film, then passing a narrow light source simultaneously and with uniform speed, transversely with respect to the lenticulations, across all the stereoscopic images over their whole width thereby copying them, whilst in a uniform movement and in the same period of time a relative sliding is effected between both said film surfaces in contact of an amplitude not greater than twice the lenticular pitch, and making it in such a direction that the emulsion of the copy is imprinted all over its extent without leaving discontinuities between the copied sereoscopic images, then placing the emulsion side of said primary copy in contact with the light-sensitive side of a secondary non-lenticular support and subjecting said emulsion side and said light-sensitive side to a very small relative and continuous sliding action in the proper direction to produce the desired change in size, while an opaque curtain with a narrow linear slit parallel to the elementary images of the primary copy is moved transversely to these elementary lineated images in front of the said primary copy across the whole width of said copy, a light source being fixed at a sufficient distance from said curtain, the degree of relative sliding of the said supports being chosen in dependence on the focal length of the taking objective of the original, to permit better visual results when observing the stereoscopic secondary copies of pictures taken at different focal lengths, so that all the secondary copies obtained may be correctly viewed in relief by the same lenticulated viewing screen, this lenticulated viewing screen being of predetermined characteristics and being in close contact with each of these secondary copies, whatever might have been the focal lengths of the taking lenses used in recording the original lenticular film from which said primary contact copy was obtained in correct relief.

References Cited in the file of this patent

UNITED STATES PATENTS

| | | |
|---|---|---|
| 1,128,979 | Hess | Feb. 16, 1915 |
| 1,176,384 | Lotka | Mar. 21, 1916 |
| 2,022,933 | Eggert et al. | Dec. 3, 1935 |
| 2,631,496 | Rehorn | Mar. 17, 1953 |
| 2,800,064 | De Lassus St-Genies | July 23, 1957 |